United States Patent Office 3,173,926
Patented Mar. 16, 1965

3,173,926
PROCESS FOR DISTINGUISHING NATURAL α-TOCOPHEROL FROM SYNTHETIC α-TOCOPHEROL
Donald R. Nelan, Rochester, N.Y., assignor to Eastman Kodak Company, Rochester, N.Y., a corporation of New Jersey
No Drawing. Filed Oct. 2, 1961, Ser. No. 141,950
3 Claims. (Cl. 260—345.5)

This invention relates to vitamins. More particularly, it relates to α-tocopherol.

α-Tocopherol is a well-known form of vitamin E. Indeed, compared to other tocopherols, namely, β-tocopherol, γ-tocopherol, etc., this organic chemical compound has the highest degree of biological activity.

α-Tocopherol is present in nature in many vegetable and animal oils. Processes for separating naturally occurring α-tocopherol (natural α-tocopherol) from these oils have been developed to such an extent that natural α-tocopherol and certain esters thereof are readily available, commercial products.

α-Tocopherol is also obtained by synthesis as by condensing phytyl bromide with trimethylhydroquinone. As a matter of fact synthetically prepared α-tocopherol (synthetic α-tocopherol) and the acetate ester thereof are likewise readily available, commercial products.

Synthetic α-tocopherol and its esters, however, differ from natural α-tocopherol and its esters in at least two properties. One property is that of optical activity. Another is that of biological activity.

The optical activity of synthetic α-tocopherol differs from natural α-tocopherol in that natural α-tocopherol has a slightly dextro specific rotation [see Baxter et al., J.A.C.S., 65, 920 (1943), who disclose $$[\alpha]^{25}5461 = +0.32°]$$

while synthetic α-tocopherol appears to be racemic, the specific rotation being $[\alpha]_D^{25} = 0°$. Because of this difference in optical activity, small as it is, natural α-tocopherol is usually referred to as d-α-tocopherol while synthetic α-tocopherol is usually identified as dl-α-tocopherol. The optical activities of the esters are similar to the parent d- and dl-α-tocopherols.

The biological activity of dl-α-tocopherol, as measured by the rat sterility assay method, is substantially less than that of d-α-tocopherol. The same is true of the esters of these compounds. This difference in biological activity is reflected in The National Formulary, Eleventh Edition, on page 459, which sets out the following equivalents, namely:

1 milligram of d-α-tocopherol = 1.49 International Unit of Vitamin E
1 milligram of dl-α-tocopherol = 1.1 International Unit of Vitamin E
1 milligram of d-α-tocopheryl acetate = 1.36 International Unit of Vitamin E
1 milligram of dl-α-tocopheryl acetate = 1.0 International Unit of Vitamin E Thus, dl-α-tocopherol has only 73.8% of the biological activity of an equal quantity of d-α-tocopherol while dl-α-tocopheryl acetate has only 73.5% of the biological activity of an equal quantity of d-α-tocopheryl acetate.

Because of this difference in biological activity, it is frequently desirable to determine which form of α-tocopherol or α-tocopheryl ester is present in an α-tocopherol or α-tocopheryl ester preparation proposed for use in drugs, foods or feeds. However, methods heretofore commonly used for the analysis of α-tocopherol and α-tocopheryl ester do not distinguish between the d and dl forms because the response to common physical and chemical measurements, with the exception of optical activity, is the same for both forms. Optical rotation measurements have not been practical heretofore because the differences in optical activity of d-α- and dl-α-tocopherols and their esters are too small. The biological assay method can be employed but the time to reach a determination is a matter of days. Under most circumstances this, too, is not practical. A need, therefore, has long existed for a practical solution to the problem of how to readily and accurately distinguish between natural d-α-tocopherol and synthetic dl-α-tocopherol and their esters so that a proper assignment of biological equivalency can be made in those instances where it is not known whether natural or synthetic α-tocopherol or their esters are involved.

A general object of this invention is to satisfy this need.

A specific object of this invention is to provide a practical process for readily and accurately distinguishing between d-α-tocopherol and dl-α-tocopherol.

Another specific object of this invention is to provide a practical process for readily and accurately distinguishing between d-α-tocopheryl ester and dl-α-tocopheryl ester.

These and other objects are achieved by this invention which is based on the concept of chemically treating a sample of the α-tocopherol under investigation with a reagent which converts the α-tocopherol to a product having a substantial specific rotation if the α-tocopherol is d-α-tocopherol and to a product having no significant specific rotation if the α-tocopherol is dl-α-tocopherol.

This invention arises from the discovery that admixing a ferricyanide in aqueous alkaline solution with d-α-tocopherol results in the formation of a product having a substantial specific rotation whereas admixing a ferricyanide in aqueous alkaline solution with dl-α-tocopherol results in a product having no significant specific rotation.

In summary, this invention in general comprises a basic process for determining whether an α-tocopherol is d-α-tocopherol or dl-α-tocopherol. This basic process comprises the steps of admixing a ferricyanide under aqueous alkaline conditions with a sample of the α-tocopherol, whereby a mixture containing a water insoluble reaction product is obtained, and then determining the specific rotation of the reaction product. If the specific rotation is essentially zero, then dl-α-tocopherol is indicated. On the other hand, if there is a substantial dextro specific rotation, then d-α-tocopherol is indicated.

This invention also involves a process for determining whether an α-tocopheryl ester (for example: α-tocopheryl acetate, α-tocopheryl acid succinate and the like) is a d-α-tocopheryl ester or a dl-α-tocopheryl ester. This process comprises hydrolysing a sample of the α-tocopheryl ester to the corresponding α-tocopherol and then performing the steps of the basic process of this invention. Hydrolysis is preferably performed according to The National Formulary, XI, page 380, or Drug Standards 25, No. 4, pages 135–6 (1957). The resulting free α-tocopherol concentrate, after dilution with an α-tocopherol solvent (for example: petroleum ether) if the concentrate is too viscous, is the α-tocopherol sample for the basic process of this invention.

The ferricyanide employed in the process of this invention is any water soluble salt of ferricyanic acid containing the trivalent $\equiv[Fe(CN)_6]$ radical. Examples of such a salt are the alkali metal and alkali earth metal ferricyanides. A particularly effective and readily available ferricyanide is potassium ferricyanide.

Concentration of ferricyanide in the mixture of α-tocopherol can vary within wide limits so long as the quantity present results in the formation of a sufficient quantity of reaction product to give an adequate optical rotation if the α-tocopherol is d-α-tocopherol. Preferably the quantity of the ferricyanide should be at least molecularly equivalent to the quantity of α-tocopherol present. The only upper limit on ferricyanide concentration is one of practicality.

Aqueous alkaline conditions are achieved by employing water and a water soluble base as the medium in which to carry out the admixing. The base preferably is any alkali metal or alkali earth metal hydroxide. Sodium hydroxide is especially useful. The concentration of the base in the water can vary within wide limits, the only important criterion being that the aqueous medium be alkaline. The water concentration can also vary within wide limits so long as there is sufficient water to dissolve the ferricyanide.

The principle involved in this process appears to be one of oxidation in view of the fact that ferricyanides are known oxidizers and in view of the published literature. See Martius and Eilingsfeld, Ann., 607, 159–168 (1957). In other words, upon admixture of α-tocopherol with a ferricyanide under alkaline conditions oxidation of the α-tocopherol takes place. In the case of d-α-tocopherol this results in the formation of an oxidation product having a substantial specific rotation. Thus, polarimeter measurements (Rudolph Polarimeter, Model 70) of 5 weight percent isooctane solutions of such an oxidation product prepared by treating National Formulary grade d-α-tocopherol, more simply referred to as d-α-tocopherol (N.F.), in accordance with this invention gave an average specific rotation of $[\alpha]_D^{25°}=+27°$. Polarimeter measurements of 5 weight percent isooctane solution of a chromatographically purified sample of this oxidation product gave an average specific rotation of $$[\alpha]_D^{25°}=+31.5$$

and $[\alpha]_{5461}^{25°}=+38.0°$. On the other hand, in the case of dl-α-tocopherol (N.F.), the resulting oxidation product had no detectable specific rotation.

The uniqueness of the basic process of this invention is demonstrated by the fact that such known oxidation products of d-α-tocopherol as d-α-tocopheroxide and d-α-tocopheryl quinone have no such enhanced specific rotations. For example, d-α-tocopheroxide prepared by the method of Boyer, J.A.C.S., 73, 733, (1951), has a slight specific rotation of $[\alpha]_D^{25}=+3.97°$ while d-α-tocopheryl quinone, prepared by oxidizing α-tocopherol with ferric chloride as disclosed in the U.S. Patent, No. 2,856,414, to Robeson et al., has an even smaller specific rotation of $[\alpha]_D^{25}=+0.49°$.

This invention is further illustrated by the following examples of specific embodiments thereof. The invention is not limited to these embodiments unless otherwise expressly indicated.

*Example 1*

This example illustrates the basic process of this invention applied to an α-tocopherol known to be d-α-tocopherol.

1.60 grams of d-α-tocopherol (N.F.) in 200 milliliters of a petroleum ether having a boiling point of 30–60° C. were shaken 2–3 minutes with 4.0 grams of potassium ferricyanide dissolved in 40 milliliters of a 0.2 N solution of water and sodium hydroxide. The resulting aqueous layer was removed. The remaining petroleum ether layer was washed several times with water and then dried over anhydrous sodium sulfate. The petroleum ether solution after removing the sodium sulfate by filtration was concentrated over a steam bath to give 1.76 grams of yellow oil.

A polarimeter measurement was made on a 5 weight percent isooctane solution of the yellow oil by means of a Hilger polarimeter, Lippich type, with a sodium vapor lamp as the light source. From this measurement the specific rotation was determined to be $[\alpha]_D^{25°}=+29.2°$.

The isooctane solvent was evaporated from the oil and the entire quantity (1.76 grams) of the yellow oil was dissolved in petroleum ether (boiling point 60° C.). The petroleum ether solution was chromatographed by introducing it into a vertical tube (1⅝ inches by 4 inches) packed with magnesium silicate. The solution was adsorbed by the magnesium silicate column. A center cut of the resulting main yellow band (80% of the column) was eluted with a solution of ethyl ether (concentration=10 weight percent) in petroleum ether. The concentrated yellow oil thus obtained was rechromatographed on a column (1 inch x 12 inches) of magnesium silicate. A middle cut of the main yellow band eluted with a solution of ethyl ether (10 weight percent concentration) in petroleum ether gave 1.0 gram of yellow oil when concentrated first under nitrogen and then under vacuum.

A polarimetric measurement was made with the same instrument on a 5 weight percent isooctane solution of the thus purified oil. From this measurement the specific rotation was determined to be $[\alpha]_D^{25°}=+31.5°$.

*Example 2*

This example illustrates the basic process of this invention applied to an α-tocopherol known to be dl-α-tocopherol.

300 milligrams of dl-α-tocopherol (N.F.) dissolved in 30 milliliters of petroleum ether (boiling point 30–60° C.) were shaken 2–3 minutes with 1.0 gram of potassium ferricyanide dissolved in 10 milliliters of a 0.2 N sodium hydroxide solution. The resulting petroleum ether layer was separated from the aqueous layer, washed several times with water and then dried over anhydrous sodium sulfate. The dried petroleum ether solution after removal of the sodium sulfate by filtration was concentrated first under nitrogen and then under vacuum. A yellow oil resulted which weighed 313 milligrams.

A polarimeter measurement by means of the same instrument employed in Example 1 was made on a 5 weight percent isooctane solution of the yellow oil. No optical rotation could be detected. Hence, the specific rotation was $[\alpha]_D^{25}=0°$.

*Example 3*

This example illustrates the concepts of this invention applied to an α-tocopheryl acetate concentrate.

A solution of 1.0 gram of an α-tocopheryl acetate concentrate and 50 milliliters of ethanol was introduced into a reaction flask fitted with a reflux condenser. The concentrate comprised 350 milligrams of a d-α-tocopheryl acetate per gram. The ethanol solution was heated under reflux for 5 minutes while 2.0 grams of 85 percent potassium hydroxide pellets were added one at a time through the reflux condenser. Reflux was continued for 20 minutes. 4 milliliters of concentrated hydrochloric acid were then added through the condenser. The acidified solution in the reaction flask was cooled, diluted with water and then extracted with 50 milliliters of petroleum ether. The resulting petroleum ether solution was separated from the water and then water washed, giving an α-tocopherol sample.

2.0 grams of potassium ferricyanide in 20 milliliters of a 0.2 N sodium hydroxide solution were added to the α-tocopherol sample and the mixture was shaken for 2–3 minutes.

The aqueous layer which then formed in the mixture was acidified with dilute hydrochloric acid and separated. The remaining petroleum ether layer was washed with water and dried over anhydrous sodium sulfate. After the petroleum ether solution was filtered to remove the sodium sulfate, it was concentrated by heating over a steam bath first under nitrogen and then under vacuum. The residue was a yellow oil weighing 0.86 gram.

The optical activity of a 5 weight percent solution of this oil in isooctane was measured by means of the polarimeter employed in Example 1. The specific rotation was thereby determined to be $[\alpha]_D^{25}=+12.8°$.

Hence, the α-tocopherol was d-α-tocopherol. Accordingly, the α-tocopheryl acetate in the concentrate was d-α-tocopheryl acetate.

Thus, this invention provides a process for rapidly and accurately distinguishing between d-α-tocopheryl ester and dl-α-tocopheryl ester, and particularly for rapidly and accurately distinguishing between d-α-tocopherol and dl-α-tocopherol.

Other embodiments, features and advantages of this invention will be apparent to those in the exercise of ordinary skill in the art upon reading the foregoing disclosure. Accordingly, all embodiments including modifications and variations thereof which incorporate the spirit and essential characteristics of this invention are within the scope of the claimed subject matter unless specifically excluded by claim language.

I claim:

1. A process for rapidly and accurately determining if an α-tocopherol is d-α-tocopherol or dl-α-tocopherol, which comprises: admixing a sample of said α-tocopherol with a water soluble ferricyanide salt in aqueous alkaline solution, whereby there is formed a mixture comprising an aqueous phase and an oil phase; and measuring the optical activity of the oil phase of said mixture, said oil phase having a substantially enhanced positive specific rotation, compared to the specific rotation of d-α-tocopherol, if said α-tocopherol is d-α-tocopherol and essentially zero specific rotation if said α-tocopherol is dl-α-tocopherol.

2. A process for rapidly and accurately determining if an α-tocopherol is d-α-tocopherol or dl-α-tocopherol, which comprises: admixing a sample of said α-tocopherol with a water soluble ferricyanide salt in aqueous alkaline solution, whereby there is formed a mixture comprising an aqueous phase and an oil phase, said oil phase containing an oxidation product of said α-tocopherol; and measuring the optical activity of said oxidation product, said oxidation product having a substantially enhanced positive specific rotation, compared to the specific rotation of d-α-tocopherol, if said α-tocopherol is d-α-tocopherol and essentially zero specific rotation if said α-tocopherol is dl-α-tocopherol.

3. A process for rapidly and accurately determining if an α-tocopherol is d-α-tocopherol or dl-α-tocopherol, which comprises: admixing a sample of said α-tocopherol with potassium ferricyanide in aqueous alkaline solution, whereby there is formed a mixture comprising an aqueous phase and an oil phase comprising an oxidation product of said α-tocopherol; measuring the optical activity of said oxidation product, said oxidation product having a substantially enhanced positive specific rotation, compared to the specific rotation of d-α-tocopherol, if said α-tocopherol is d-α-tocopherol and essentially zero specific rotation if said α-tocopherol is dl-α-tocopherol.

References Cited in the file of this patent

The Merck Index of Chemicals and Drugs, 7th edition, pp. 1100–1101, Merck & Co., Inc., Rahway, N.J. (1960).

Finar: Organic Chemistry, 2d edition, vol. 2, Butler & Tanner Ltd., London (1959).

Martius et al.: Annalen der Chemie, vol. 607, page 167 (1957).